United States Patent
Xiong et al.

(10) Patent No.: US 10,336,048 B1
(45) Date of Patent: *Jul. 2, 2019

(54) FILM LAMINATOR FOR CELL PHONES

(71) Applicant: Alpha Comm Enterprises, LLC, Lawrenceville, GA (US)

(72) Inventors: Qiang Xiong, Shenzheng (CN); Shaoyu Lin, Shantou (CN); Lingbin Kong, Lawrenceville, GA (US)

(73) Assignee: Alpha Comm Enterprises, LLC, Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,322

(22) Filed: Aug. 17, 2018

Related U.S. Application Data

(63) Continuation-in-part of application No. 14/945,189, filed on Nov. 18, 2015, now Pat. No. 10,076,894.

(60) Provisional application No. 62/641,556, filed on Mar. 12, 2018.

(51) Int. Cl.
*B32B 37/00* (2006.01)
*B32B 38/18* (2006.01)

(52) U.S. Cl.
CPC ........ *B32B 37/0046* (2013.01); *B32B 37/003* (2013.01); *B32B 38/1841* (2013.01); *B32B 2307/412* (2013.01); *B32B 2457/208* (2013.01)

(58) Field of Classification Search
USPC ........ 156/247, 249, 289, 297, 701, 291, 750
See application file for complete search history.

(56) References Cited

U.S. PATENT DOCUMENTS

| | | | |
|---|---|---|---|
| 7,435,921 B2 | 10/2008 | Rae et al. | |
| 8,369,072 B1 | 2/2013 | Alonzo et al. | |
| 8,675,353 B1 | 3/2014 | Alonzo et al. | |
| 9,192,086 B2 | 11/2015 | Hsu et al. | |
| 10,076,894 B2 * | 9/2018 | Lin | B32B 37/0046 |
| 2010/0092713 A1 | 4/2010 | Bullard et al. | |

(Continued)

*Primary Examiner* — Sing P Chan
(74) *Attorney, Agent, or Firm* — Hill, Kertscher & Wharton, LLP

(57) ABSTRACT

According to the utility model, there is provided a film laminator for cell phones, useful for film lamination on a surface of a cell phone, including: a cell phone fixing plate, on which a through hole for receiving the cell phone is established, and a top surface of which is a horizontal face; with at least one position limiting plate for abutting the cell phone within the through hole being also fixed on the top surface. The film laminator for cell phones further includes: a film laminating plate for fixing a cell phone film; one end of which is hinged to the cell phone fixing plate, and the other end of which is movable freely so that the film laminating plate is bonded with the top surface of the cell phone fixing plate. With respect to the film laminator for cell phones according to the utility model, because the position limiting plate is provided on the cell phone fixing plate, the surface of the cell phone to which a film is to be attached can handily be kept in flush with the top surface of the cell phone fixing plate. Upon film lamination, the film laminating plate can contact with the top surface of the cell phone fixing plate and the surface of the cell phone to which a film is to be attached at the same time, so that the stress that is laid on it in the course of film lamination is very even, and a good effect of film lamination is obtained.

19 Claims, 6 Drawing Sheets

(56) References Cited

U.S. PATENT DOCUMENTS

| | | |
|---|---|---|
| 2010/0200456 A1 | 8/2010 | Parkinson |
| 2012/0211170 A1 | 8/2012 | Patel et al. |
| 2013/0020020 A1 | 1/2013 | Liu |
| 2014/0124146 A1 | 5/2014 | Patel et al. |
| 2014/0130971 A1 | 5/2014 | Wu et al. |
| 2014/0230988 A1 | 8/2014 | Chou |
| 2015/0246514 A1 | 9/2015 | LaColla et al. |
| 2015/0277502 A1 | 10/2015 | Witham et al. |

\* cited by examiner

FILM LAMINATOR FOR CELL PHONES

CROSS REFERENCE TO RELATED APPLICATIONS

This application claims priority under 35 U.S.C. §§ 119(e) and 120 to application Ser. No. 14/945,189 filed Nov. 18, 2015 and Appl. Ser. No. 62/641,556 filed Mar. 12, 2018.

TECHNICAL FIELD

The utility model relates to a manufacturing technology of cell-phone peripheral products, especially a film laminator for cell phones, and pertains to the field of film laminating equipments.

DESCRIPTION OF THE RELATED ART

With the development of society and the improvement of living standards, more and more people start to use portable electronic devices, such as cell phones, tablet computers, etc. For ease of reading, the screen size of portable electronic devices is gradually increased, and people become more and more aware about screen protection. In general, people will attach a layer of protective film to the screen of a portable digital device. However, with the increasing frequency of use, the increasing of friction and a scratch from outside, the protective film is very easy to be destroyed, and then re-lamination of film is required. In prior art, a manual mode is usually employed for conducting film lamination on a digital product. That is, after three layers of laminated films are aligned with the screen of an electronic device, an outer film in the first layer is peeled off firstly; next, an end of a primary film is attached to the screen of the electronic device, and air under the primary film is squeezed out slowly so that the primary film is attached to the screen of the electronic device; finally, a protective film in the outermost layer is peeled off. As regards the manual film lamination in prior art, the following circumstances are liable to occur: laminated films are not easy to align, bubbles are produced easily, and so on. In a word, the film laminating quality of manual film lamination is difficult to be ensured.

Another mode in prior art is to conduct film lamination by use of a roller, but its roller facility has a complex manufacturing process and a high cost, and it can only be used to stick a flexible thin film.

SUMMARY OF THE UTILITY MODEL

According to embodiments of the utility model, there is provided a film laminator for cell phones that has a low cost, a good film laminating quality and is usable to stick a hard thin film.

A film laminator for cell phones provided by an embodiment of the utility model, useful for film lamination on a surface of a cell phone, includes: a cell phone fixing plate, on which a through hole for receiving the cell phone is established, and a top surface of which is a horizontal face; with at least one position limiting plate for abutting the cell phone within the through hole being also fixed on the top surface;
the film laminator for cell phones further includes: a film laminating plate for fixing a cell phone film; one end of which is hinged to the cell phone fixing plate, and the other end of which is movable freely so that the film laminating plate is bonded with the top surface of the cell phone fixing plate.

As for the film laminator for cell phones stated above, wherein, two sets of positioning holes are provided on the cell phone fixing plate; and the position limiting plate is two, each of which is fixed onto the cell phone fixing plate by means of one set of positioning holes.

As for the film laminator for cell phones stated above, wherein, a groove for fixing the cell phone film is provided on the film laminating plate, and is established on a face of the film laminating plate for bonding with the cell phone fixing plate.

As for the film laminator for cell phones stated above, wherein, the cell phone film includes a first outer film, a primary film and a second outer film that are stacked sequentially, a separating strip is provided at an end of the first outer film, an end of the second outer film is jointed to the film laminating plate, and an adhering sheet is arranged between the first outer film and the primary film.

As for the film laminator for cell phones stated above, wherein, when the film laminating plate is bonded with the top surface of the cell phone fixing plate, the groove coincides with the through hole.

As for the film laminator for cell phones stated above, wherein, the shape of the through hole is the same as the shape of profile of the cell phone.

As for the film laminator for cell phones stated above, wherein, each of the position limiting plates is located at an edge of the through hole, and each of the position limiting plates covers a part of the through hole.

As for the film laminator for cell phones stated above, wherein, the film laminating plate is a transparent construct.

As for the film laminator for cell phones stated above, wherein, an exhaust through hole is established on the film laminating plate, and communicates with the bottom of the groove. As for the film laminator for cell phones stated above, wherein, the cell phone fixing plate is a hard paper board, and its thickness is in the range of 2.5 to 7 mm; the film laminating plate is a hard paper board, and its thickness is in the range of 0.5 to 1.5 mm; the position limiting plate is a PET board, and its thickness is in the range of 0.1 to 0.5 mm.

With respect to the film laminator for cell phones according to the utility model, because the position limiting plate is provided on the cell phone fixing plate, the surface of the cell phone to which a film is to be attached can handily be kept in flush with the top surface of the cell phone fixing plate. Upon film lamination, the film laminating plate can contact with the top surface of the cell phone fixing plate and the surface of the cell phone to which a film is to be attached at the same time, so that the stress that is laid on it in the course of film lamination is very even, and bubbles are not liable to occur. Thus, a good effect of film lamination is obtained. Furthermore, as the film laminating plate is hinged to the cell phone fixing plate, and a precise corresponding relationship between the cell phone film and the cell phone to which a film is to be attached can be obtained, the accuracy of alignment of the laminated film is guaranteed.

BRIEF DESCRIPTION OF THE DRAWINGS

In order to illustrate the technical solution in the embodiments of the utility model or in prior art more clearly, the drawings necessary for description of the embodiments or existing technologies will be briefly introduced below; it is obvious that the drawings as described below are only related to some embodiments of the utility model, and based on these drawings, other drawings can also be obtained by those ordinarily skilled in the art without any inventive work.

DESCRIPTION OF THE PREFERRED EMBODIMENTS

Figure 1:
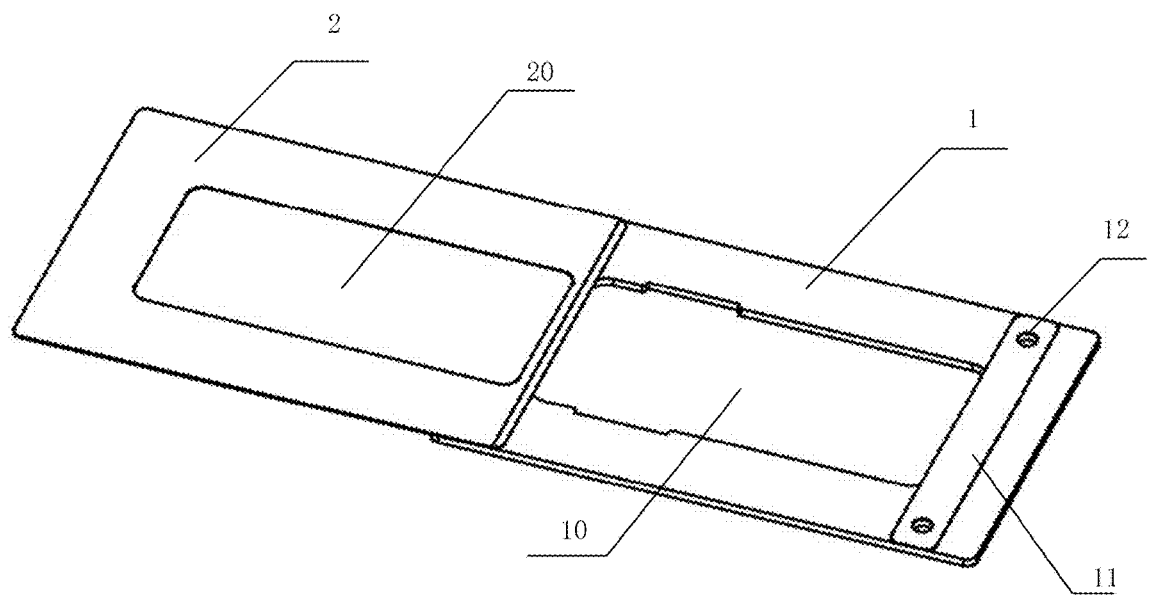
FIG. 1 is a structural view illustrating a film laminator for cell phones according to an embodiment of the utility model.

Hereinafter, technical solution in embodiments of the utility model will be described in a clearly and fully understandable way in conjunction with accompanied drawings in embodiments of the utility model. It is obvious that the described embodiments are just a part but not all of the embodiments of the utility model. Based on the embodiments in the utility model, those ordinarily skilled in the art can obtain other embodiment(s), without any inventive work, which come(s) within the scope sought for protection by the utility model.

As shown in FIGS. 1 to 5, a film laminator for cell phones is provided by the embodiment, and useful for film lamination on a surface of a cell phone. The film laminator for cell phones according to the embodiment includes: a cell-phone fixing plate 1 and a film laminating plate 2. A top surface of the cell-phone fixing plate 1 is a horizontal face, and in the cell-phone fixing plate, there is established a through hole 10 for receiving a cell phone, so that edges of the cell phone fit in with sidewalls of the through hole 10. On the top surface of the cell-phone fixing plate 1, there is further provided at least one position limiting plate 11 for abutting a cell phone within the through hole 10. The position limiting plate 11 is fixed to the top surface of the fixing plate 1, and is useful for abutting a surface of the cell phone to which a film is to be attached, so as to make sure that the surface of the cell phone to which a film is to be attached lies in the same plane as the top surface of the cell-phone fixing plate 1. In general, the position limiting plate 11 serves to abut an edge of the surface of the cell phone 3 to which a film is to be attached, and as such, not only the normal film lamination is not affected, but also the surface of the cell phone to which a film is to be attached can be assured of lying in the plane on which the top surface is located. The film laminating plate 2 is useful for fixing a cell-phone film 30, one end of the film laminating plate 2 is hinged to the cell-phone fixing plate 1, and the other end of it is movable freely so that the film laminating plate 2 is bonded with the top surface of the cell-phone fixing plate 1. The position limiting plate 11 is usually two, which are generally designed to be at both sides of the through hole 10; of course, the position limiting plate 11 may also be one. In the case that one position limiting plate is adopted, the position limiting plate 11 is usually U-shaped. This can make sure that the surface of the cell phone to which a film is to be attached fully abuts the position limiting plate 11 as well.

Figure 4:
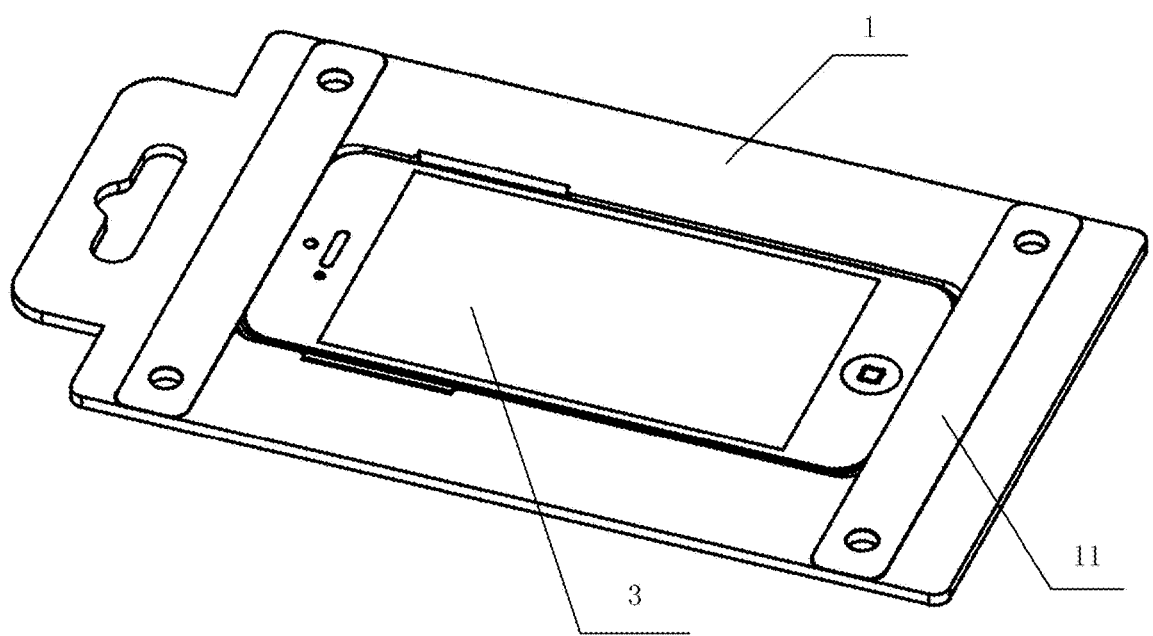
FIG. 4 is a view illustrating a service state of a cell-phone fixing plate of a film laminator for cell phones according to an embodiment of the utility model.

When embodiments of the utility model are in use, because the position limiting plate 11 is provided on the cell-phone fixing plate 1, the surface of the cell phone 3 to which a film is to be attached can handily be kept in flush with the top surface of the cell-phone fixing plate 1. Upon film lamination, the film laminating plate 2 can contact with the top surface of the cell-phone fixing plate 1 and the surface of the cell phone 3 to which a film is to be attached (as shown in FIG. 4, which is usually the screen of the cell phone 3) at the same time, so that the stress that is laid on it in the course of film lamination is very even, and bubbles are not liable to occur. Thus, a good effect of film lamination is obtained. Embodiments of the utility model are especially adaptable for sticking hard cell-phone thin films, such as glass films, thin films of toughened glass, sapphire films, or the like. As the top surface of the cell-phone fixing plate 1 lies in the same plane as the surface of the cell phone 3 to which a film is to be attached, when a hard thin film is stuck on, there is no such case where it is splintered due to uneven stress laid on it. Thus, the sticking quality is guaranteed. Furthermore, as the film laminating plate 2 is hinged to the cell-phone fixing plate 1, and a precise corresponding relationship between the cell-phone film 30 and the cell phone 3 to which a film is to be attached can be obtained, the accuracy of alignment of the laminated film is guaranteed.

On the basis of the above embodiment, a hanging hole 15 is further provided on the cell-phone fixing plate 1 in the embodiment. The hanging hole 15 is generally located at a terminal of the cell-phone fixing plate 1, and is usually in a long strip shape. A notch may also be provided on a side wall of the hanging hole 15, so that the cell-phone fixing plate 2 is kept in balance in a state of hanging.

Figure 2:
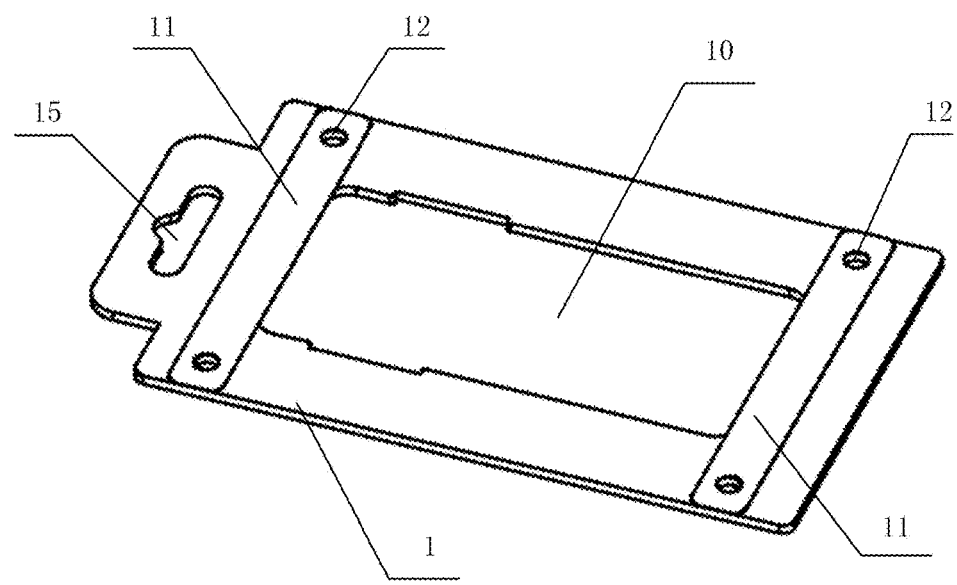
FIG. 2 is a top perspective view illustrating a cell-phone fixing plate of a film laminator for cell phones according to an embodiment of the utility model.
Figure 3:
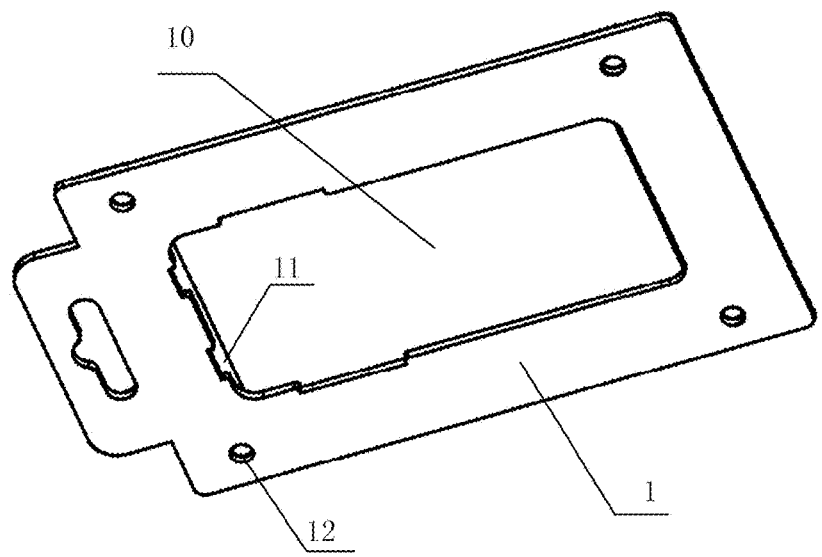
FIG. 3 is a bottom perspective view illustrating a cell-phone fixing plate of a film laminator for cell phones according to an embodiment of the utility model.

On the basis of the above embodiment, two sets of positioning holes 12 are provided on the cell-phone fixing plate 1; the position limiting plate 11 is two, each of which is fixed onto the cell-phone fixing plate 1 by means of a set of positioning holes 12. With the design of positioning holes 12, position fixing accuracy of fixing the position limiting plate 11 onto the cell-phone fixing plate 1 can be assured, and a good contact is also guaranteed when a bottom surface of the position limiting plate abuts the surface of the cell phone 3 to which a film is to be attached. As shown in FIG. 2, preferably, in the case that two position limiting plates 11 are adopted, each of the position limiting plates 11 is located at an edge of the through hole 10, and each of the position limiting plates 11 covers a part of the through hole 10. As can be seen from FIG. 3, each of the position limiting plate 11 goes beyond an edge of the through hole 10 approximately by 1 to 3 mm, so that an edge of the cell phone 3 abuts well against the position limiting plate 11 and the region for film lamination is not affected.

On the basis of the above embodiment, further, a groove 20 for fixing the cell-phone film 30 is provided on the film laminating plate 2, and is established on a face of the film laminating plate 2 for bonding with the cell-phone fixing plate 1. In general, when the film laminating plate 2 is bonded with the top surface of the cell-phone fixing plate 1, the groove 20 coincides with the through hole 10. Especially when the cell-phone film is stuck on the cell phone screen, the groove 20 and the through hole 10 are substantially equal in area. Of course, when the film is attached to the cell phone screen, the shape of the through hole 10 is the same as the shape of profile of the cell phone 3, so that the cell phone 3 is firmly clamped within the through hole 10 on the cell-phone fixing plate 1.

On the basis of the above embodiment, further, the cell-phone film 30 includes a first outer film, a primary film and a second outer film that are stacked sequentially. A separating strip (not shown in the figure) is provided at an end of the first outer film, an end of the second outer film is jointed to the film laminating plate, and an adhering sheet is arranged between the first outer film and the primary film.

Figure 5:
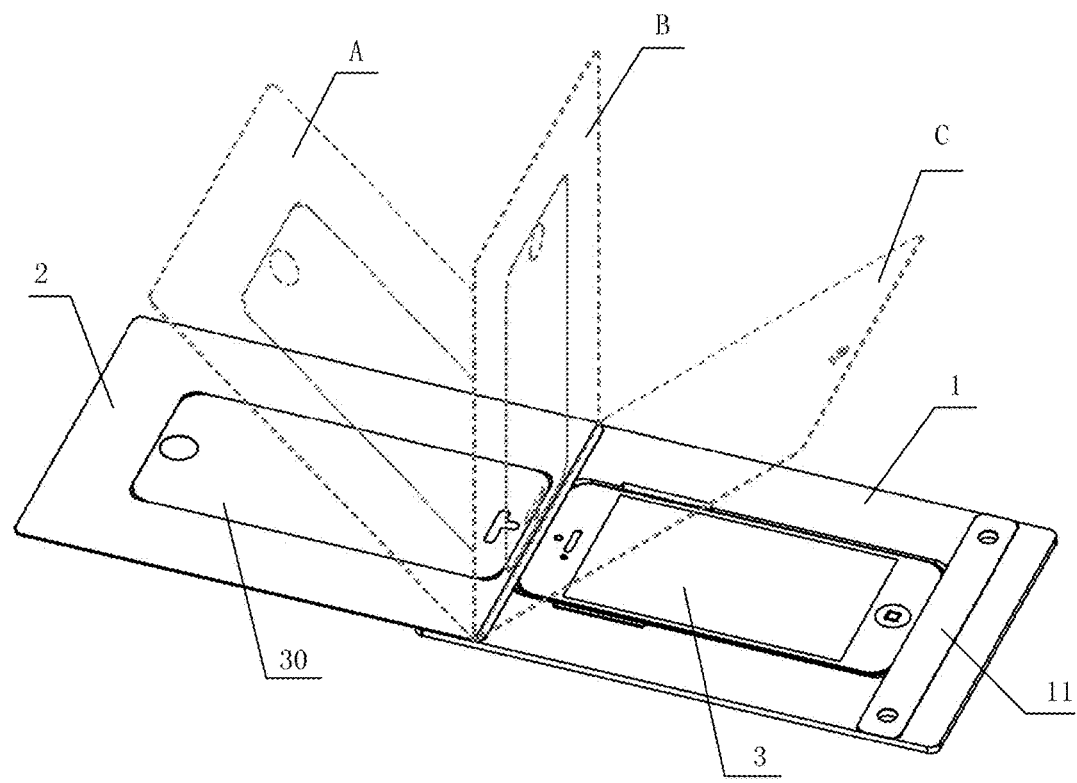
FIG. 5 is a schematic view illustrating a film laminating process of a film laminator for cell phones according to an embodiment of the utility model.

As shown in FIG. 5, after the cell-phone film 30 is fixed onto the film laminating plate 2, the first outer film is torn off by the aid of the separating strip, and the film laminating plate 2 is bonded with the top surface of the cell-phone fixing plate 1 after it has passed through three positions of A, B and C in sequence, so that the primary film is stuck on a surface of the cell phone 3 to which a film is to be attached with the adhering sheet. Subsequent to the film sticking, open the film laminating plate 2. As the second outer film is fixed onto the film laminating plate 2, the second outer film is automatically separated from the primary film. Thus, the entire process of film lamination is completed.

On the basis of the above embodiment, further, the position limiting plate 11 is generally made of a hard plastic plate, preferably a PET board, and its thickness is in the range of 0.1 to 0.5 mm. The film laminating plate 2 is usually also made of a hard material, and for the sake of reducing the cost, is preferably a hard paper board, and its thickness is in the range of 0.5 to 1.5 mm. The cell-phone fixing plate 1 is a hard paper board, and its thickness is in the range of 2.5 to 7 mm. A hard paper board is usually made of multiple levels of hard paperboard by pressing, so as to ensure a sufficient strength. Certainly, the used hard materials are each a thin plate or a sheet possessing a certain hardness, such as a plastic board, a cardboard sandwich plate, or the like.

Figure 6:
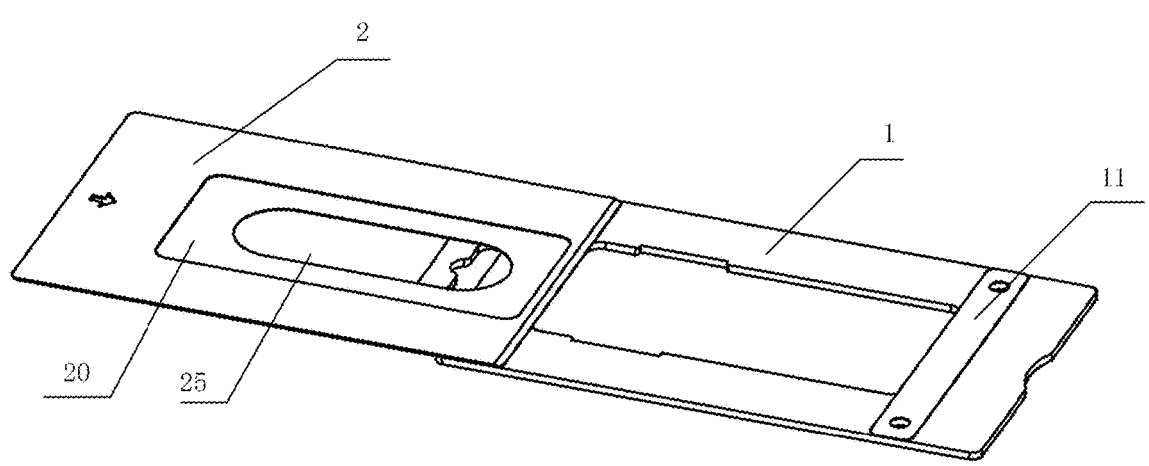
FIG. 6 is a structurally schematic view illustrating a film laminator for cell phones according to another embodiment of the utility model.
Figure 7:
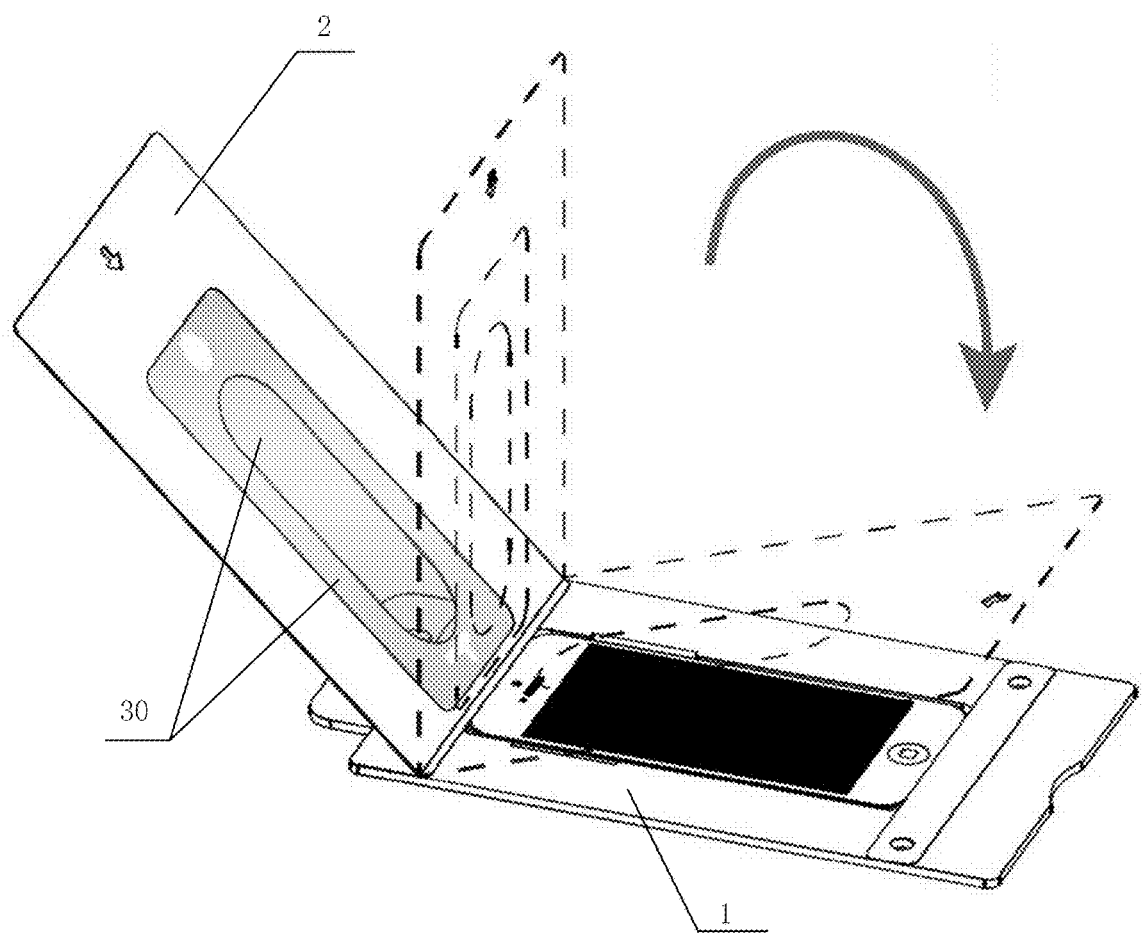
FIG. 7 is a schematic view illustrating a film laminating process of a film laminator for cell phones according to another embodiment of the utility model.
Figure 8:
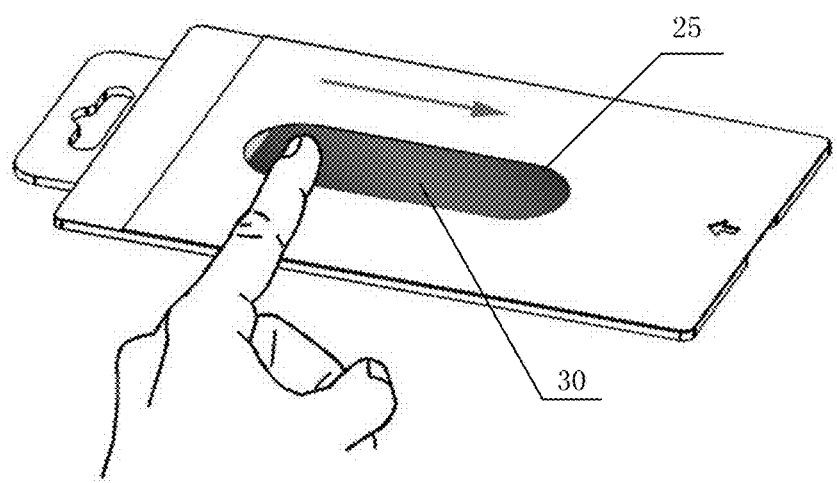
FIG. 8 is a schematic view illustrating pressing of a cell-phone film of a film laminator for cell phones according to another embodiment of the utility model.

As shown in FIG. 6, FIG. 7 and FIG. 8, in another embodiment of the utility model, a film laminating plate 2 is usually a transparent construct. That is, in a practical application process, a transparent plastic substance or other transparent material with a certain hardness is used for the film laminating plate 2. Because the film laminating plate 2 is a transparent construct, in the entire process of film lamination, an operator can visually inspect whether or not dust or air bubbles is/are present between a primary film and the surface of a cell phone to which a film is to be attached. Therefore, the success rate of film lamination and the quality of film lamination are improved greatly.

On the basis of the above embodiment, further, an exhaust through hole 25 is established on the film laminating plate 2, and communicates with the bottom of a groove 20. The exhaust through hole 25 is generally designed to be in the center of the groove 20, and is usually in the shape of an oval or a long strip, and its size is usually subject to receptibility of a thumb. The function of the exhaust through hole 25 is not merely limited to such a function that the residual air between a cell-phone film 30 and the film laminating plate 2 can be discharged by it, but also it can facilitate the operation. As shown in FIG. 8, after a primary film of the cell-phone film 30 is aligned with the surface of a cell phone to which a film is to be attached, an operator presses a central zone of the cell-phone film 30 via the exhaust through hole 25 so that the central zone of the cell-phone film 30 is bonded firstly. Thus, bubbles are prevented from generating in the central zone, and the operational quality is improved. It is to be noted that, when an opaque substance is used for the film laminating plate 2, the opaque substance takes priority for establishment of the exhaust through hole 25 on it over others. As such, not only the cost can be saved, but also the quality of laminated film is improved greatly.

It is to be noted that, the technical solution of the embodiment is not limited to the field of cell phones, rather, digital products such as tablet computers, digital cameras, digital music players and the like each can adopt the solution of the utility model for film lamination. Of course, the utility model is especially adapted for the sticking of a hard cell-phone film, such as, a glass film, a thin film of toughened glass, a sapphire film, or the like.

Figure 10:
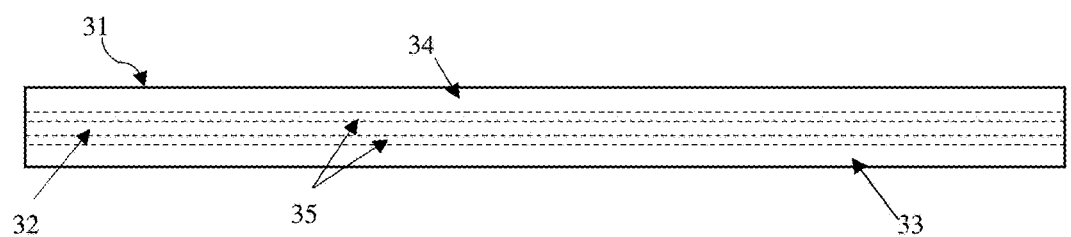
FIG. 10 is a side schematic view illustrating the protective film assembly in an alternative embodiment.
Figure 11:
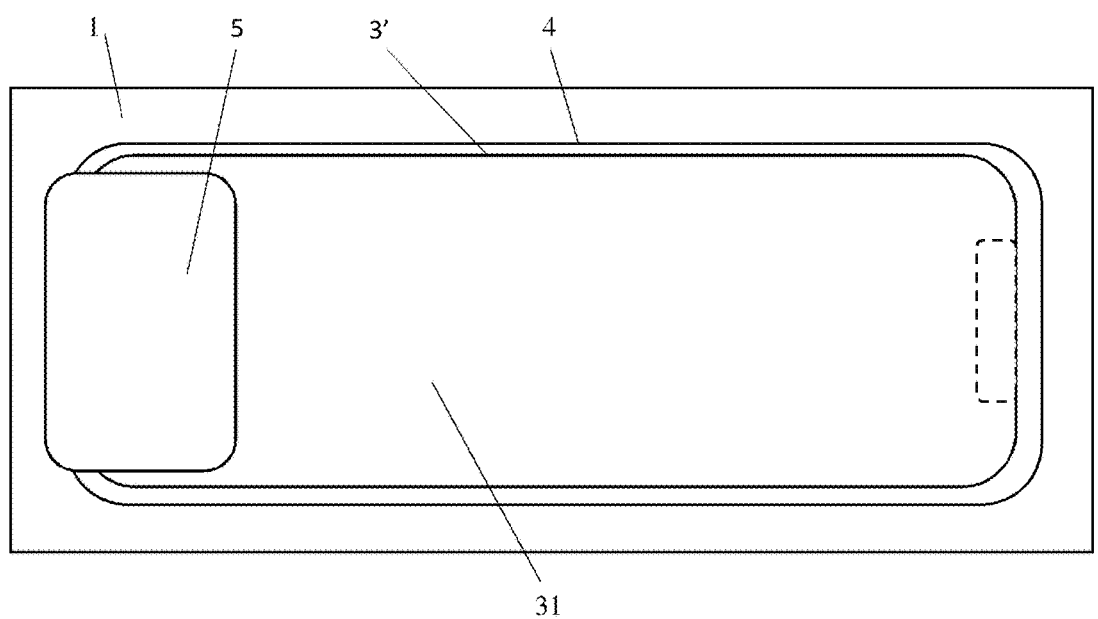
FIG. 11 is a top schematic view illustrating an alternate embodiment of the protective film applicator.

Many of the latest portable electronic devices feature screens that encompass almost the entire flat upper surface of the device, e.g. the iPhone X™. For these devices, the embodiments described thus far that employ position limiting plate(s) 11 are not optimal because the protective film extends to the edges of the screen, and there may not be a portion of the device that the position limiting plates 11 can contact without blocking a portion of the screen. The embodiment shown in FIGS. 9-11 addresses this issue. This embodiment features fixing plate 1, hinge 5, and protective film assembly 31. Protective film assembly 31 is similar in structure to cell-phone film 30 described above, and is shown in detail in FIG. 10. Protective film assembly 31 in this embodiment is comprised of primary protective film 32, which is sandwiched between a first covering layer 33 and second covering layer 34. Adhesive film layers 35 are comprised of releasable adhesives and bond the first and second covering layers to primary protective film 32 prior to it being applied to device 3'. Adhesive film layer 35 also facilitates the bonding of primary protective film 32 to the screen of device 3'. The particular embodiment shown in FIG. 10 is for use with PET and thermoplastic polyurethane (TPU) films. Other embodiments featuring tempered glass protectors or other materials having high scratch resistance do not utilize second covering layer 34 and adhesive layer 35.

In this embodiment, the top of the device 3' is not held in place relative to the top surface of fixing plate 1 using position limiting plates 11. Instead, a supporting sidewall 4 extends downward from fixing plate 1 to a common surface supporting both fixing plate 1 and device 3'. The height of sidewall 4 is such that the top surface of device 3' to which the film is to be applied is coplanar with the horizontal top surface of fixing plate 1 when the device 3' is placed on the supporting surface, i.e., the top horizontal surface of fixing plate 1 is even with the surface of the device to which the protective film is to be applied. In certain embodiments, sidewall 4 is continuous around device 3' (i.e. completely surrounding device 3'); however, in other embodiments, there may be one or more sidewalls 4. Fixing plate 1 and sidewall(s) 4 may be made of injection-molded materials such as polycarbonate, acrylonitrile butadiene styrene, polyvinyl chloride, polystyrene, acrylic, and the like. Hinge 5 can be comprised of any flexible material such as polyethylene or paper. In one certain embodiment, hinge 5 is a paper sticker having a non-drying adhesive that attaches directly to the primary protective film 32 as shown in FIG. 10. The adhesive permits the hinge to be easily peeled off once the primary protective film 32 has been applied to the device screen.

Figure 9:
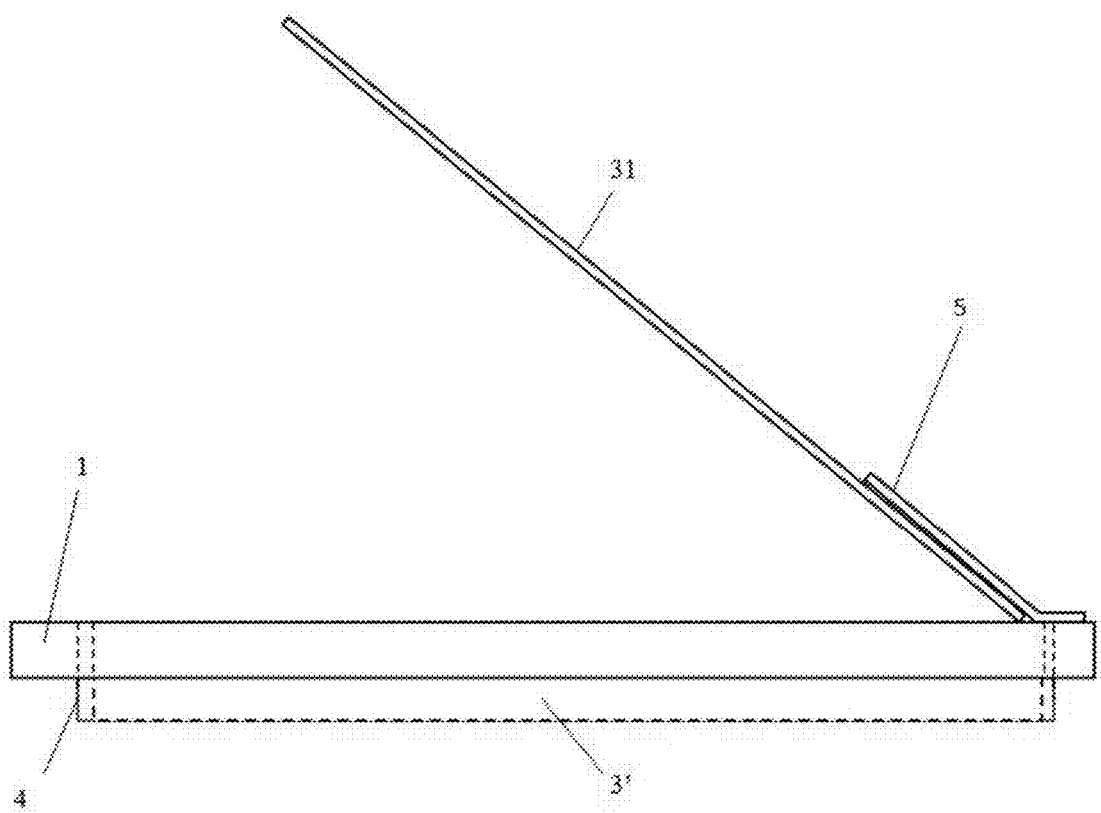
FIG. 9 is a side schematic view illustrating an alternate embodiment of the protective film applicator.

FIG. 9 is a side profile view of the embodiment showing hinge 5, one end of which is bonded to the horizontal top surface of fixing plate 1, and the other end of which is bonded to protective film assembly 31, specifically to second covering layer 34. In certain embodiments, protective film assembly 31 does not have a second covering layer 34. In these embodiments, hinge 5 is bonded directly to primary protective film 32 using adhesive that does not dry, such as that manufactured by 3M Corporation. This adhesive permits the entire applicator assembly to be lifted away from the device once the primary protective film 32 is applied to the screen.

The embodiment featuring sidewall 4 is used by first placing device 3' on a supporting surface. The embodiment is then placed over device 3' so that both are supported by the supporting surface. In this configuration, the top of device 3' and the horizontal top surface of fixing plate 1 should at the same level, i.e. coplanar. The first covering layer 33 is then removed using a separating tab either firmly bonded to, or integral with, first covering layer 33. This exposes adhesive layer 35, which is brought into contact with the surface of the device's screen and which adheres primary protective film 32 thereto. Once primary protective film 32 is in place, the second covering layer 34 is removed with the aid of a separating tab such that adhesive layer 35 remains with the secondary covering layer 34.

With reference to the specific embodiments stated above, the objectives, technical solutions and beneficial effects of the utility model have been further explained in detail. It should be understood that, descriptions made above are merely specific embodiments of the utility model, but are not used to limit the protective scope of the utility model. All modifications, equivalent replacements, improvements or the like, made within the spirit and principle of the utility model, shall be embraced in the protective scope of the utility model.

What is claimed is:

1. An apparatus for applying protective film to the screen of a portable electronic device having a defined shape, comprising:
   a fixing plate shaped to receive said portable electronic device, said fixing plate having a horizontal top surface and an opening in said horizontal top surface accommodating the defined shape of said portable electronic device;
   a protective film assembly comprising a first outer film, a primary protective film layer, and a second outer film; and
   a hinge bonded to a portion of said protective film assembly and to said horizontal top surface of said fixing plate,
   wherein said first outer film is configured to be completely removed from said primary protective film layer, using a separating strip, prior to adhering said primary protective film layer to the screen of said portable electronic device.

2. The apparatus according to claim 1, wherein said second outer film is configured to be completely removed from said primary protective film layer subsequent to adhering said primary protective film layer to the screen of said portable electronic device.

3. The apparatus according to claim 2, wherein after said first outer film is completely removed and prior to completely removing said second outer film from said primary protective layer, said apparatus is configured to permit an operator to press a central zone of said primary protective film layer against said screen of said portable electronic device.

4. The apparatus according to claim 1, wherein said primary protective film layer comprises tempered glass.

5. The apparatus according to claim 1, further comprising a position limiting plate attached to said fixing plate, wherein said position limiting plate controls at least one boundary of said opening.

6. The apparatus according to claim 1, further comprising a through hole, said through hole configured to receive said portable electronic device.

7. The apparatus according to claim 1, further comprising a hole that provides access to a backside of said portable electronic device.

8. The apparatus according to claim 1, wherein after said primary protective layer is aligned with said screen of said portable electronic device, said apparatus is configured to permit an operator to press a central zone of said primary protective film layer against said screen of said portable electronic device.

9. The apparatus according to claim 1, wherein said protective film assembly comprises a film laminating plate, wherein said hinge is bonded to an end portion of said film laminating plate.

10. A method of producing an apparatus for applying protective film to the screen of a portable electronic device, comprising the steps of:
    forming a fixing plate having an opening shaped for receiving said portable electronic device;
    forming a protective film assembly comprising at least a primary protective film layer and a first outer film;
    joining said protective film assembly and said fixing plate using a hinge having a first end and a second end, wherein said first end of said hinge is bonded to one end of said protective film assembly and said second end of said hinge is bonded to a top horizontal surface of said fixing plate,
    wherein said first outer film is configured to be completely removed from said primary protective film layer prior to adhering said primary protective film layer to the screen of said portable electronic device.

11. The method of claim 10, wherein said protective film assembly further comprises a second outer film, said second outer film configured to be completely removed from said primary protective film layer subsequent to adhering said primary protective film layer to the screen of said portable electronic device.

12. The method of claim 10, wherein said primary protective film layer comprises tempered glass.

13. A protective film applicator for use with a portable electronic device having a defined shape, said protective film applicator comprising:
    a fixing structure comprising an opening corresponding to the defined shape of said portable electronic device, wherein said opening is formed in a top horizontal surface of said fixing structure;
    a protective film assembly comprising at least a primary protective film layer and a first outer film; and
    a hinge joining an upper portion of said protective film assembly and said top horizontal surface of said fixing structure, wherein said protective film assembly is movable freely at a lower portion of said protective film assembly,
    wherein said first outer film is configured to be completely removed from said primary protective film layer prior to adhering said primary protective film layer to a screen of said portable electronic device.

14. The protective film applicator according to claim 13, wherein said protective film assembly comprises a separating strip to facilitate complete removal of said first outer film prior to adhering said primary protective film layer to the screen of said portable electronic device.

15. The protective film applicator according to claim 13, wherein said fixing structure comprises a fixing plate and a position limiting plate, wherein said fixing plate and said position limiting plate define the opening.

16. The protective film applicator according to claim 13, wherein said fixing structure is formed from plastic.

17. The protective film applicator according to claim 13, wherein said protective film assembly further comprises a second outer film, said second outer film configured to be completely removed from said primary protective film layer subsequent to adhering said primary protective film layer to the screen of said portable electronic device.

18. The protective film applicator according to claim 13, wherein after said primary protective layer is aligned with said screen of said portable electronic device, said protective film applicator being configured to permit an operator to press a central zone of said primary protective film layer against said screen of said portable electronic device.

19. The protective film applicator according to claim 13, wherein said primary protective film layer comprises tempered glass.

\* \* \* \* \*